United States Patent
Kobayashi et al.

(10) Patent No.: US 10,744,742 B2
(45) Date of Patent: Aug. 18, 2020

(54) THERMAL TRANSFER SHEET

(71) Applicant: Dai Nippon Printing Co., Ltd., Tokyo (JP)

(72) Inventors: Yoshimasa Kobayashi, Tokyo (JP); Takao Otomaru, Tokyo (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 0 days.

(21) Appl. No.: 16/333,028

(22) PCT Filed: Sep. 22, 2017

(86) PCT No.: PCT/JP2017/034289
§ 371 (c)(1),
(2) Date: Mar. 13, 2019

(87) PCT Pub. No.: WO2018/062038
PCT Pub. Date: Apr. 5, 2018

(65) Prior Publication Data
US 2019/0224944 A1 Jul. 25, 2019

(30) Foreign Application Priority Data

Sep. 28, 2016 (JP) ................................ 2016-190280

(51) Int. Cl.
*B32B 7/06* (2019.01)
*B32B 27/08* (2006.01)
(Continued)

(52) U.S. Cl.
CPC .............. *B32B 7/06* (2013.01); *B32B 27/08* (2013.01); *B41M 5/385* (2013.01); *B41M 5/44* (2013.01);
(Continued)

(58) Field of Classification Search
CPC .......... B41M 7/0027; Y10T 428/24802; Y10T 428/24364
(Continued)

(56) References Cited

U.S. PATENT DOCUMENTS 5,494,885 A 2/1996 Kudo et al.
6,346,316 B1 2/2002 Saito et al.
(Continued)

FOREIGN PATENT DOCUMENTS

CN 101423001 A 5/2009
JP S62-238791 A1 10/1987
(Continued)

OTHER PUBLICATIONS

International Search Report and Written Opinion (Application No. PCT/JP2017/034289) dated Nov. 7, 2017.
(Continued)

*Primary Examiner* — Betelhem Shewareged
(74) *Attorney, Agent, or Firm* — Burr & Brown, PLLC

(57) ABSTRACT

A thermal transfer sheet including a dye layer and a transfer layer on a substrate. The transfer layer has a protective layer and an adhesive layer containing two or more resin components. One of the resin components is a copolymer of a reactive ultraviolet absorbing agent and an acrylic monomer. In the copolymer, the copolymerization ratio of the reactive ultraviolet absorbing agent is in the range of 10% or more and 50% or less on a molar ratio basis and the copolymerization ratio of the acrylic monomers is in the range of 50% or more and 90% or less on a molar ratio basis. The content of the copolymer of the reactive ultraviolet absorbing agent and the acrylic monomer is specified in the range of 50% by mass or more and 90% by mass or less on the basis of the total mass of the adhesive layer.

5 Claims, 1 Drawing Sheet

(51) Int. Cl.
    *B41M 5/385*     (2006.01)
    *B41M 5/44*     (2006.01)
    *B41M 7/00*     (2006.01)
    *B41M 5/382*     (2006.01)

(52) U.S. Cl.
    CPC ..... *B41M 7/0027* (2013.01); *B32B 2307/748* (2013.01); *B41M 5/38214* (2013.01); *B41M 2205/02* (2013.01); *B41M 2205/30* (2013.01); *Y10T 428/24364* (2015.01); *Y10T 428/24802* (2015.01)

(58) Field of Classification Search
    USPC ........................................................ 428/32.6
    See application file for complete search history.

(56) References Cited

U.S. PATENT DOCUMENTS

| | | | |
|---|---|---|---|
| 2002/0197453 A1* | 12/2002 | Usuki | B41M 7/0027 428/195.1 |
| 2003/0165753 A1* | 9/2003 | Suzuki | B41M 7/0027 430/14 |
| 2006/0068174 A1 | 3/2006 | Sato | |
| 2014/0267535 A1 | 9/2014 | Yoneyama et al. | |
| 2015/0258834 A1* | 9/2015 | Yabe | B32B 27/306 106/162.72 |
| 2016/0039237 A1* | 2/2016 | Yoshida | C09D 153/00 347/217 |
| 2016/0221376 A1 | 8/2016 | Yabe et al. | |
| 2019/0224944 A1* | 7/2019 | Kobayashi | B41M 5/385 |

FOREIGN PATENT DOCUMENTS

| | | |
|---|---|---|
| JP | H07-290848 A1 | 11/1995 |
| JP | 2000-071626 A1 | 3/2000 |
| JP | 2002-362068 A1 | 12/2002 |
| JP | 2006-124686 A1 | 5/2006 |
| JP | 2006-327193 A1 | 12/2006 |
| JP | 2007-090782 A1 | 4/2007 |
| JP | 2010-058287 A1 | 3/2010 |
| JP | 2013-082212 A1 | 5/2013 |
| JP | 2013-180455 A1 | 9/2013 |
| JP | 2014-198430 A1 | 10/2014 |
| JP | 2015-091645 A1 | 5/2015 |

OTHER PUBLICATIONS

Extended European Search Report (Application No. 17855992.8) dated Sep. 26, 2019.
Chinese Office Action (Application No. 201780054583.8) dated Jun. 1, 2020 (with English translation).

* cited by examiner

THERMAL TRANSFER SHEET

TECHNICAL FIELD

The present invention relates to thermal transfer sheets.

BACKGROUND ART

Sublimation type thermal transfer methods have been widely used to form a thermal transferred image on a transfer receiving article because such methods can easily form images with excellent transparency and high reproducibility of neutral tints and high gradation, as well as high quality equivalent to conventional full-color photographic images. As prints in which a thermal transferred image is formed on a transfer receiving article, digital photographs, and identification (ID) cards, which are used in various fields such as identification papers, driver's license cards, membership cards, are known.

For forming a thermal transferred image in accordance with the sublimation type thermal transfer method, a thermal transfer sheet having a dye layer provided on one surface of a substrate and a transfer receiving article, for example, a thermal transfer image-receiving sheet having a receiving layer provided on one surface of another substrate, are used. Then, the dye layer of the thermal transfer sheet is superposed on the transfer receiving article, and heat is applied by a thermal head from the back side of the thermal transfer sheet to allow the dye in the dye layer to migrate. As such, a print in which a thermal transferred image is formed on the transfer receiving article can be obtained. With respect to the sublimation type thermal transfer method, since the migration amount of dye can be controlled by the amount of energy applied to the thermal transfer sheet, it is possible to perform a density gradation. Thus, this method can form a high-quality print comparable to full-color photograph images, being very vivid and excelling in transparency, color reproducibility of halftones and gradation.

Recently, in order to meet demands to obtain prints in which a thermal transferred image is formed on any transfer receiving article other than a thermal transfer image-receiving sheet, an intermediate transfer medium in which a receiving layer is releasably provided on a substrate has been proposed (e.g., Patent Literature 1). According to this intermediate transfer medium, the dye in the dye layer of the thermal transfer sheet is allowed to transfer onto the receiving layer of the intermediate transfer medium to form a thermal transferred image. Thereafter, it is possible to transfer the receiving layer onto any transfer receiving article by heating the back side of the intermediate transfer medium, thereby obtaining a print in which the thermal transferred image is formed on any transfer receiving article.

In a print obtained by forming a thermal transferred image on the receiving layer of a thermal transfer image-receiving sheet in accordance with the sublimation type thermal transfer method or in a print obtained by forming a thermal transferred image on the receiving layer of an intermediate transfer medium in accordance with the sublimation type thermal transfer method and retransferring this receiving layer onto any transfer receiving article, the receiving layer on which the thermal transferred image is formed is located on the outermost surface of the print. However, although the thermal transfer image formed on the receiving layer in accordance with the sublimation type thermal transfer method is excellent in the formation of a gradation image as mentioned above, the print formed has a disadvantage such as inferior physical durability including abrasion resistance because the print, unlike prints formed with usual printing ink, is formed not with pigments but with dyes each having a relatively low molecular weight, and includes no vehicle.

Under such circumstances, a wide range of attempts have been made, in which a protective layer transfer sheet having a substrate and a protective layer (it may be referred to as an exfoliate layer or transfer layer) provided releasably from the substrate is used to transfer the protective layer onto a receiving layer having a thermal transferred image formed thereon (e.g., Patent Literature 2). According to a protective layer transfer sheet as that proposed in Patent Literature 2, transferring the protective layer onto the receiving layer on which the thermal transferred image is formed can improve the durability of the thermal transferred image.

Alternatively, as a variation of the protective layer transfer sheet provided with the protective layer, a thermal transfer sheet in which a dye layer of at least one color and a protective layer releasable from the substrate are provided on one surface of the substrate, as being frame sequentially, has been proposed (e.g., Patent Literature 3). According to the thermal transfer sheet as that proposed in Patent Literature 3, it is possible to form a thermal transferred image and transfer a protective layer onto the thermal transferred image formed by using one thermal transfer sheet.

By the way, a thermal transfer sheet is usually stored and used in a rolled-up state. When the thermal transfer sheet is in the rolled-up state, the dye layer is in direct contact with the back side of the thermal transfer sheet (hereinafter, it is referred to as a back face layer). Thus, in the case where the dye of the dye layer is likely to migrate to the back face layer side, the dye contained in the dye layer migrates (so-called "is kicked") to the back face layer when the thermal transfer sheet is rolled up. Alternatively, in the case where a thermal transfer sheet in which a dye layer and a protective layer releasable from the substrate are provided on one surface side of the substrate, as being frame sequentially, is employed as described above, if the dye that has been kicked to the back face layer remigrates (so-called "backs") to the protective layer, various problems may occur, such as deterioration in the quality of the print onto which the protective layer has been transferred and a decrease in the transferability of the protective layer.

Additionally, a protective layer to be transferred onto the thermal transferred image is required to have high light fastness, in addition to physical durability such as abrasion resistance.

CITATION LIST

Patent Literature

Patent Literature 1: Japanese Patent Laid-Open No. 62-238791

Patent Literature 2: Japanese Patent Laid-Open No. 2013-82212

Patent Literature 3: Japanese Patent Laid-Open No. 7-290848

SUMMARY OF INVENTION

Technical Problem

The present invention has been made in view of the above-mentioned circumstances, and the present invention aims principally to provide a thermal transfer sheet capable of imparting sufficient abrasion resistance and light fastness simultaneously to a transfer layer and capable of sufficiently inhibiting a dye that has been kicked to the back side of the thermal transfer sheet from backing to the surface of the transfer layer.

Solution to Problem

The present invention for solving the above problems is a thermal transfer sheet comprising a transfer layer and a dye layer provided on one surface of a substrate, as being frame sequentially, characterized in that the transfer layer has a layered structure comprising a protective layer and an adhesive layer layered in this order from the side of the substrate; the adhesive layer contains two or more resin components; one of the two or more resin components is a copolymer of a reactive ultraviolet absorbing agent and an acrylic monomer; in the copolymer of the reactive ultraviolet absorbing agent and the acrylic monomer, the copolymerization ratio of the reactive ultraviolet absorbing agent is in the range of 10% or more and 50% or less on a molar ratio basis and the copolymerization ratio of the acrylic monomers is in the range of 50% or more and 90% or less on a molar ratio basis; and the content of the copolymer of the reactive ultraviolet absorbing agent and the acrylic monomer is in the range of 50% by mass or more and 90% by mass or less on the basis of the total mass of the adhesive layer.

The other one component of the two or more resin components may be either one or both of an acryl type resin and a vinyl chloride-vinyl acetate copolymer.

The protective layer may contain a binder resin and talc.

The binder resin contained in the protective layer may be any of an acryl type resin, a polycarbonate type resin, and a phenoxy type resin.

The reactive ultraviolet absorbing agent, which constitutes the copolymer of the reactive ultraviolet absorbing agent and an acrylic monomer, may be a benzotriazole type reactive ultraviolet absorbing agent.

Advantageous Effect of Invention

According to the thermal transfer sheet of the present invention, it is possible to impart sufficient abrasion resistance and light fastness simultaneously to the transfer layer and to inhibit a dye that has been kicked to the back side of the thermal transfer sheet from backing to the surface of the transfer layer.

DESCRIPTION OF EMBODIMENTS

«Thermal Transfer Sheet»

Hereinafter, a thermal transfer sheet 100 of one embodiment of the present invention (hereinafter, it is referred to as the thermal transfer sheet of one embodiment) will be described concretely using drawings.

Figure 1:
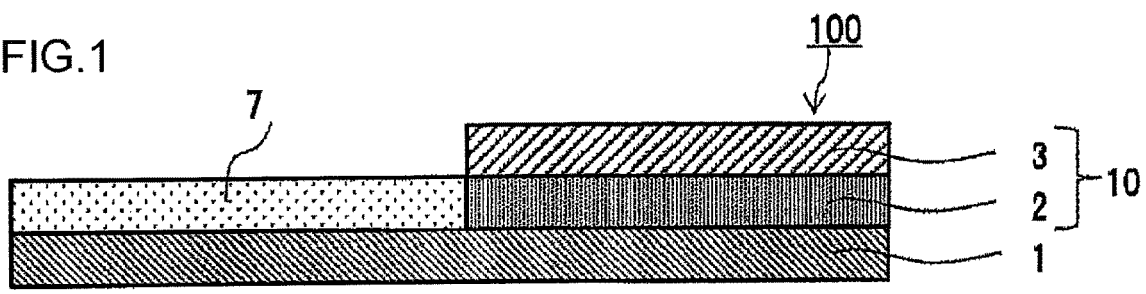
FIG. 1 is a schematic sectional view showing an example of the thermal transfer sheet of one embodiment.
Figure 2:
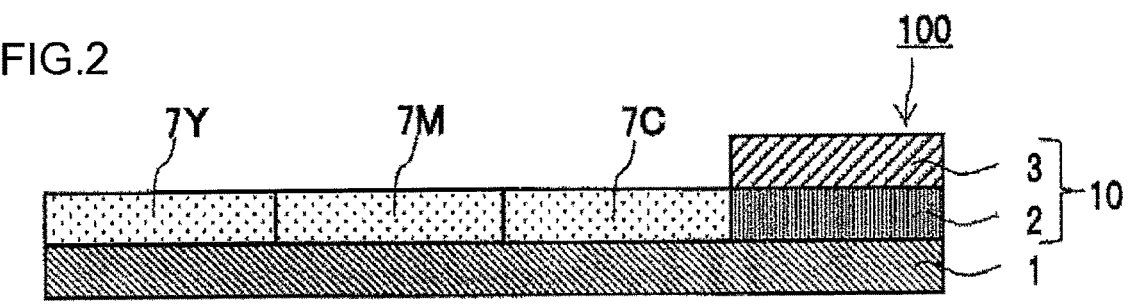
FIG. 2 is a schematic sectional view showing an example of the thermal transfer sheet of one embodiment.

As shown FIGS. 1 and 2, in the thermal transfer sheet 100 of one embodiment, a dye layer 7 and a transfer layer 10 are provided on one surface of a substrate 1, as being frame sequentially. The transfer layer 10 has a layered structure in which a protective layer 2 and an adhesive layer 3 are layered in this order from the side of the substrate 1. In the thermal transfer sheet of the embodiment shown in FIG. 1, the dye layer 7 is composed of a single layer. In the thermal transfer sheet 100 of the embodiment shown in FIG. 2, the dye layer 7 is composed of a plurality of layers (dye layers 7Y, 7M, and 7C). Hereinafter, each constituent will be explained.

(Substrate)

The substrate 1, which is an essential constituent in the thermal transfer sheet 100 of one embodiment, retains the transfer layer 10 located on one surface of the substrate 1. Although there is no particular limitation on the material of the substrate 1, materials that are resistant to heat to be applied in transferring the transfer layer 10 and have mechanical properties so as to be handled without a hitch are preferable. As the substrate 1 like this, for example, various plastic films or sheets of: polyesters such as polyethylene terephthalate and polyethylene naphthalate, polyarylate, polycarbonate, polyurethane, polyimide, polyetherimide, cellulose derivatives, polyethylene, ethylene-vinyl acetate copolymers, polypropylene, polystyrene, acryl, polyvinyl chloride, polyvinylidene chloride, polyvinyl alcohol, polyvinyl butyral, nylon, polyetheretherketone, polysulfone, polyethersulfone, tetrafluoroethylene-perfluoroalkyl vinyl ether copolymers, polyvinyl fluoride, tetrafluoroethylene-ethylene, tetrafluoroethylene-hexafluoropropylene copolymers, polychlorotrifluoroethylene, and polyvinylidene fluoride may be enumerated. These materials each may be used solely, or may be used as a layered product thereof in combination with another material. The thickness of the substrate 1 may be properly set depending on the type of the material, so that the strength and heat resistance of the substrate lie in appropriate ranges. The thickness is preferably in the range of 0.5 µm or more and 50 µm or less, more preferably in the range of 1 µm or more and 20 µm or less, and particularly preferably in the range of 1 µm or more and 10 µm or less.

In the substrate 1 of a preferred embodiment, the center average roughness (SRa), the peak count (SPc), and the maximum projection height (SRm) on the surface on the side of the substrate 1 opposed to the transfer layer 10 satisfy SRa ≤20 nm and SPc ≤100, and SRm ≤1100 nm, respectively. According to the substrate 1 of the above preferred embodiment, it is possible to transfer the transfer layer 10 such that the surface on the side opposed to the substrate 1 of the transfer layer 10 is embossed by the smooth surface of the substrate 1. Thus, it is possible to smooth the peeling interface of the transfer layer 10, that is, the surface of the transfer layer 10 after transfer. The smoothness of the surface of the transfer layer 10 closely relates to the glossiness of the transfer layer 10. Enhancing the smoothness of the surface of the transfer layer 10 can enhance the glossiness of the transfer layer 10 transferred. Incidentally, when flaws or the like on the surface of the transfer layer 10 are made by enhancing the glossiness of the transfer layer 10, the flaws made are more likely to be noticeable. However, as described below, the thermal transfer sheet of one embodiment has abrasion resistance enhanced by the protective layer 2 included in the transfer layer 10, and thus, such consideration is not required.

(Transfer Layer)

As shown in FIGS. 1 and 2, the transfer layer 10 is provided on one surface of the substrate 1 (the upper surface of the substrate 1 in the embodiment shown). The transfer layer 10 has a layered structure in which the protective layer 2 and the adhesive layer 3 are layered in this order from the side of the substrate 1.

(Protective Layer)

The protective layer 2, which constitutes the transfer layer 10, is a layer to impart abrasion resistance to a print on which the transfer layer 10 has been transferred.

There is no particular limitation on the binder resin contained in the protective layer 2, and for example, polyester type resins, acryl type resins, polycarbonate type resins, phenoxy type resins, ultraviolet absorbing resins, epoxy type resins, polystyrene type resins, polyurethane type resins, acrylic urethane type resins, silicone-modified forms of these resins, any blends of these resins, ionizing radiation curable resins, and ultraviolet absorbing resins may be enumerated. The protective layer 2 may contain one of these or may contain two or more of these, as the binder resin.

The protective layer 2 of the preferred embodiment contains at least one selected from the group of acryl type resins, polycarbonate type resins, and phenoxy type resins, as the binder resin. The protective layer 2 of a more preferred embodiment contains an acryl type resin as the binder resin. According to the protective layer that contains any of acryl type resins, polycarbonate type resins, and phenoxy type resins as the binder resin, it is possible to further improve the abrasion resistance.

The word "acryl type resin" used herein includes polymers of acrylic acid or methacrylic acid or derivatives thereof, polymers of an acrylic acid ester or methacrylic acid ester or derivatives thereof, copolymers of acrylic acid or methacrylic acid with other monomers or derivatives thereof, and copolymers of an acrylic acid ester or methacrylic acid ester with other monomers or derivatives thereof.

As the acrylic acid ester or methacrylic acid ester, for example, alkyl acrylates and alkyl methacrylates may be enumerated. Concretely, methyl acrylate, methyl methacrylate, ethyl acrylate, ethyl methacrylate, butyl acrylate, butyl methacrylate, lauryl acrylate, lauryl methacrylate, 2-hydroxyethyl acrylate, 2-hydroxyethyl methacrylate, 2-hydroxybutyl acrylate, 2-hydroxybutyl methacrylate, 2-hydroxy-3-phenoxypropyl acrylate, and 2-hydroxy-3-phenoxypropyl methacrylate may be enumerated.

As the other monomers, for example, aromatic hydrocarbons, aryl group-containing compounds, amide group-containing compounds, and vinyl chloride, styrene, benzylstyrene, phenoxyethyl methacrylate, acrylamide, and methacrylamide may be enumerated.

As the acryl type resin, it is also possible to use an acrylic polyol resin obtained by copolymerizing one or two or more of acrylic acid alkyl esters with one or two or more of (meth)acrylic acid esters having a hydroxyl group in the molecule such as 2-hydroxyethyl (meth)acrylate, 2-hydroxybutyl (meth)acrylate, and 2-hydroxy-3-phenoxypropyl (meth)acrylate, and, if necessary, with one or two or more of the other polymerizable monomers such as styrene.

The word "phenoxy type resin" used herein means a thermoplastic resin having a hydroxyl group(s) in a molecular chain, obtained by a condensation reaction between various bisphenol compounds and epichlorohydrin.

The word "polycarbonate type resin" used herein means a resin composition mainly based on polycarbonate. As the polycarbonate type resin, those produced by an interfacial polymerization method, a transesterification method, a pyridine method or the like from bisphenol A, which is synthesized from bisphenol and acetone, polyester carbonates obtained by copolymerization of bisphenol A and a dicarboxylic acid derivative such as dichloride tere(iso)phthalate, and those obtained by polymerization of a derivative of bisphenol A such as tetramethyl bisphenol A may be enumerated.

There is not particular limitation on the content of the binder resin. The content is preferably in the range of 50% by mass or more and 98% by mass or less, more preferably in the range of 70% by mass or more and 98% by mass or less, and particularly preferably in the range of 90% by mass or more and 98% by mass or less, on the basis of the total solid mass of the protective layer 2.

The protective layer 2 of the preferred embodiment contains talc together with the binder resin. The protective layer 2 of a particularly preferred embodiment contains any of acryl type resins, phenoxy type resins, and polycarbonate type resins together with talc. According to the protective layer 2 containing talc together with the binder resin, it is possible to impart higher abrasion resistance to the protective layer 2. Accordingly, it is possible to impart higher abrasion resistance to a print to be obtained by transferring the protective layer 2.

Particularly, the protective layer 2 preferably contains talc having a specific surface area of 10 $m^2/g$ or less together with the binder resin. According to the protective layer 2 containing talc having a specific surface area of 10 $m^2/g$ or less together with the binder resin, it is possible to impart extremely high abrasion resistance to a print to be obtained by transferring the protective layer 2.

There is not particular limitation on the content of talc. The content of the talc is preferably in the range of 2% by mass or more and 10% by mass or less on the basis of the total mass of the protective layer 2. According to the protective layer 2 containing talc in a preferred range, it is possible to further improve the abrasion resistance, in comparison with a protective layer 2 containing talc out of this range.

The protective layer 2 may also contain additives other than those exemplified as above, for example, various silicone oils, polyethylene waxes, metal soaps such as zinc stearate, zinc stearyl phosphate, calcium stearate, and magnesium stearate, release agents such as fatty acid amides, polyethylene waxes, carnauba waxes, and paraffin waxes, known ultraviolet absorbing agents such as benzophenone type, benzotriazole type, benzoate type, triazine type, titanium oxide, and zinc oxide ultraviolet absorbing agents, light stabilizers such as hindered amine type and Ni-chelate type light stabilizers, and antioxidants such as hindered phenol type, sulfur type, phosphorus type, and lactone type antioxidants. The protective layer 2 may contain one of these or may contain two or more of these, as the additives.

No particular limitation is imposed on the method of forming the protective layer 2. The protective layer may be formed by dissolving or dispersing a binder resin, and talc and various additives to be added if necessary into a suitable solvent to prepare a coating liquid for the protective layer, coating this coating liquid onto one surface of the substrate 1 or onto a layer which is optionally provided on one surface of the substrate 1, and then drying the coated liquid. As the coating method, for example, the gravure printing method, the screen printing method, and the reverse roll coating method using a gravure plate may be enumerated. Coating methods other than these methods may be also used. This also applies to coating methods for various coating liquids to be described below.

There is not particular limitation on the thickness of the protective layer 2. The thickness is preferably in the range of 0.5 μm or more and 10 μm or less.

(Adhesive Layer)

As shown in FIGS. 1 and 2, an adhesive layer 3 is provided directly or indirectly, via another layer, on the protective layer 2. The adhesive layer 3, which is an essential constituent in the thermal transfer sheet 100 of one embodiment, is a layer constituting the transfer layer 10. That is, the adhesive layer 3 is a layer that migrates onto the counter side, for example, the receiving layer, onto which a thermal transferred image has been formed, of a thermal transfer image-receiving sheet, together with the protective layer 2.

With respect to the thermal transfer sheet 100 of one embodiment, in order to impart a high back prevention property, which enables inhibition of a back that may occur when the thermal transfer sheet 100 is rolled up and stored, and high light fastness to a print onto which the transfer layer 10 has been transferred, the adhesive layer 3 constituting the transfer layer 10 is conditioned to have the following (feature 1)(feature 3). According to the thermal transfer sheet 100 of one embodiment having the features, it is possible to impart a high back prevention property and high light fastness simultaneously to the adhesive layer 3. Thus, according to the thermal transfer sheet 100 of one embodiment, it is possible to impart sufficient abrasion resistance and light fastness to a print to be obtained by transferring the transfer layer 10, by virtue of the abrasion resistance possessed by the protective layer 2 and the light fastness possessed by the adhesive layer 3. In the case where the thermal transfer sheet rolled up and stored is rolled back or the like, it is possible to sufficiently inhibit a dye that has migrated (has been kicked) to the back side of the thermal transfer sheet from remigrating (backing) to the surface of the transfer layer (adhesive layer), by virtue of the high back prevention property possessed by the adhesive layer.

(Feature 1) The adhesive layer contains two or more resin components, and one of the components is a copolymer of a reactive ultraviolet absorbing agent and an acrylic monomer;

(Feature 2) The copolymerization ratio of the reactive ultraviolet absorbing agent in the copolymer of the reactive ultraviolet absorbing agent and the acrylic monomer is in the range of 10% or more and 50% or less on a molar ratio basis, and the copolymerization ratio of the acrylic monomers is in the range of 50% or more and 90% or less on a molar ratio basis; and (Feature 3) The content of the copolymer of the reactive ultraviolet absorbing agent and the acrylic monomer is in the range of 50% by mass or more and 90% by mass or less on the basis of the total mass of the adhesive layer.

Hereinafter, a copolymer of the reactive ultraviolet absorbing agent and the acrylic monomer having a copolymerization ratio of the reactive ultraviolet absorbing agent of 10% or more and 50% or less on a molar ratio basis and a copolymerization ratio of the acrylic monomers of 50% or more and 90% or less on a molar ratio basis is referred to as the "specific copolymer", occasionally.

Incidentally, in the thermal transfer sheet 100 of one embodiment, the adhesive layer 3 is essentially conditioned to satisfy all of the above (feature 1)-(feature 3). This is because, in the case where the adhesive layer does not satisfy any one of the above features, it is not possible to impart a sufficient back prevention property and sufficient light fastness to the adhesive layer.

Concretely, in the case where the adhesive layer does not contain the "specific copolymer", it is not possible to impart sufficient light fastness to the adhesive layer 3. On the other hand, even if the adhesive layer contains the "specific copolymer", in the case where the content thereof is less than 50% by mass, it is not possible to impart sufficient light fastness to the adhesive layer. Particularly, in the case where a resin other than acryl type resins is employed as the other resin component described below, it is not possible to impart sufficient light fastness to the adhesive layer, and it is also not possible to impart a sufficient back prevention property to the adhesive layer. In the case where the content exceeds 90% by mass, even if the "specific copolymer" resin and the other resin described below are contained in the adhesive layer, it is not possible to impart sufficient abrasion resistance and a sufficient back prevention property to the adhesive layer.

Even in the case where the adhesive layer contains a copolymer of a reactive ultraviolet absorbing agent and an acrylic monomer and satisfies the above (feature 1) and (feature 3), if the copolymerization ratio of the reactive ultraviolet absorbing agent in this copolymer is less than 10%, it is not possible to impart sufficient light fastness to the adhesive layer. On the other hand, when the copolymerization ratio of the reactive ultraviolet absorbing agent exceeds 50%, it becomes difficult to impart a sufficient back prevention property and sufficient abrasion resistance to the adhesive layer. Furthermore, when the copolymerization ratio of the reactive ultraviolet absorbing agent exceeds 50%, the compatibility of ink that forms the adhesive layer decreases, and thus, the glossiness of the adhesive layer is likely to decrease. Particularly, in the case where an acryl type resin is employed the other resin component described below, the compatibility tends to markedly decrease. In the case where the copolymerization ratio of the acrylic monomers exceeds 90%, the copolymerization ratio of the reactive ultraviolet absorbing agent becomes lower as the increment of the acrylic monomers, and it becomes difficult to impart sufficient light fastness to the adhesive layer. On the other hand, in the case where the copolymerization ratio of the acrylic monomers is less than 50%, it becomes difficult to impart a sufficient back prevention property and sufficient abrasion resistance to the adhesive layer.

With respect to the adhesive layer 3 of the preferred embodiment, the copolymerization ratio of the reactive ultraviolet absorbing agent in the "specific copolymer" is in the range of 15% or more and 45% or less, particularly in the range of 20% or more and 40% or less, on a molar ratio basis, and the copolymerization ratio of the acrylic monomers is in the range of 55% or more and 85% or less, particularly in the range of 60% or more and 80% or less, on a molar ratio basis.

In the case where the adhesive layer contains a copolymer of a reactive ultraviolet absorbing agent and other monomers different from acrylic monomers, instead of the "specific copolymer", even if the copolymerization ratio of the reactive ultraviolet absorbing agent and the other monomers different from acrylic monomers and the content of this copolymer satisfy the ranges specified in the above (feature 2) and (feature 3), it is not possible to satisfy any of the back prevention property, abrasion resistance, and glossiness simultaneously. For example, in the case where the adhesive layer is prepared by including a copolymer formed by copolymerizing a reactive ultraviolet absorbing agent and styrene type monomers without inclusion of the "specific copolymer", it is not possible to satisfy either the abrasion resistance or the back prevention property. Alternatively, in the case where the adhesive layer is prepared by including a copolymer formed by copolymerizing a reactive ultraviolet absorbing agent and phenoxy type monomers without inclusion of the "specific copolymer", it is not possible to satisfy the abrasion resistance sufficiently. Alternatively, in the case where the adhesive layer is prepared by including a copolymer formed by copolymerizing a reactive ultraviolet absorbing agent and a polycarbonate type resin without inclusion of the "specific copolymer", it is not possible to satisfy the back prevention property. Alternatively, in the case where the adhesive layer contains a copolymer of a component different from the reactive ultraviolet absorbing agent and an acrylic monomer instead of the "specific copolymer", even if the copolymerization ratio of the component different from the reactive ultraviolet absorbing agent and the acrylic monomer and the content of this copolymer satisfy the ranges specified in the above (feature 2) and (feature 3), it is not possible to impart sufficient light fastness to the adhesive layer.

There is no particular limitation on the reactive ultraviolet absorbing agent constituting the "specific copolymer", and any of conventionally known reactive ultraviolet absorbing agents can be selected appropriately and used herein. As an example of the reactive ultraviolet absorbing agent, those which are prepared by introducing an addition-polymerizable double bond such as a vinyl group, acryloyl group, and methacryloyl group or an alcoholic hydroxyl group, amino group, carboxyl group, epoxy group, isocyanate group or the like into a non-reactive ultraviolet absorbing agent, as a conventionally known ultraviolet absorbing agent, such as a salicylate type, benzophenone type, benzotriazole type, triazine type, substituted acrylonitrile type, nickel-chelate type, or hindered amine type ultraviolet absorbing agent may be enumerated. Of these reactive ultraviolet absorbing agents, it can be said that a benzotriazole type reactive ultraviolet absorbing agent, which is capable of imparting higher light fastness to an adhesive layer that contains the "specific copolymer" as a copolymer of the benzotriazole type reactive ultraviolet absorbing agent and an acrylic monomer, is a preferable reactive ultraviolet absorbing agent.

As the acrylic monomers constituting the "specific copolymer", monomers constituting an acryl type resin can be selected appropriately and used herein. Incidentally, as the acrylic monomers, acrylic acid, methacrylic acid, acrylic acid esters, and methacrylic acid esters, which have been explained in relation to the protective layer 2 described above, may be enumerated.

The adhesive layer 3 of the preferred embodiment contains a copolymer of a reactive ultraviolet absorbing agent with either one or both of methyl methacrylate (MMA) and methacrylic acid (MAA) as the "specific copolymer".

In the "specific copolymer", other polymerization component(s) may be additionally copolymerized. As the other copolymerization component(s), for example, styrene monomers may be enumerated. In addition to these, a hindered amine type light stabilizer (HALS), an antioxidant, or the like, which is effective for capturing radicals, may be further copolymerized. As the antioxidant, phenol type antioxidants having a function of regenerating a hindered amine type light stabilizer (HALS) are preferable. Incidentally, the copolymerization ratio of the other polymerization component(s) in the "specific copolymer" is only required to be 40% or less and is preferably 20% or less, on a molar ratio basis.

The thermal transfer sheet 100 of one embodiment is characterized in that the adhesive layer 3 contains two or more resin components and one of these is the "specific copolymer". According to the adhesive layer 3 containing other resin component(s) together with the "specific copolymer", it is possible to impart a high back prevention property and high light fastness simultaneously to the adhesive layer 3. Hereinafter, of the two or more resin components, the resin components other than the "specific copolymer" will be described.

<Other Resin Components>

There is no particular limitation on other resin component(s), together with the "specific copolymer", contained in the adhesive layer 3. For example, acryl type resins, vinyl chloride-vinyl acetate copolymers, epoxy resins, polyester resins, polycarbonate resins, butyral resins, polyamide resins, and vinyl chloride resins may be enumerated. The adhesive layer 3 may contain one of these or may contain two or more of these, as the other resin component(s).

The adhesive layer 3 of the preferred embodiment contains either one or both of an acryl type resin and a vinyl chloride-vinyl acetate copolymer as the other resin component(s), together with the "specific copolymer". According to the adhesive layer 3 of the preferred embodiment, it is possible to further improve the glossiness of the transfer layer 10. In the adhesive layer 3 containing an acryl type resin as the other resin component together with the "specific copolymer", the acryl type resin is a preferable resin component in respect of having a back prevention property particularly better than that of other resin component(s). As the acryl type resin as the other resin component(s), the acryl type resin or the like which has been explained in relation to the protective layer 2 described above can be selected appropriately and used herein.

The adhesive layer 3 of a particularly preferred embodiment contains polymethyl methacrylate (PMMA) having a glass transition temperature (Tg) of 90° C. or more and a weight average molecular weight (Mw) of 10000 or more and 50000 or less, as the other resin component. Incidentally, the word "glass transition temperature (Tg)" used herein means a temperature determined by the DSC (differential scanning calorimetry) in compliance with JIS-K-7121 (2012). The expression "weight average molecular weight (Mw)" means a value in terms of polystyrene standard measured by Gel Permeation Chromatography (GPC) in compliance with JIS-K-7252-1 (2008).

There is not particular limitation on the content of the other resin component(s). In view of the compatibility of ink containing the "specific copolymer" and the other resin component(s) and the back prevention property, the total mass of the other resin components is preferably in the range of 10% by mass or more and 50% by mass or less, more preferably in the range of 15% by mass or more and 45% by mass or less, and further preferably in the range of 20% by mass or more and 40% by mass or less, on the basis of the total mass of the "specific copolymer" and the other resin component(s). In other words, the total mass of the "specific copolymer" is preferably 50% by mass or more and 90% by mass or less, more preferably 55% by mass or more and 85% by mass or less, and further preferably 60% by mass or more and 80% by mass or less, on the basis of the total mass of the "specific copolymer" and the other resin component(s). The adhesive layer 3 of the preferred embodiment also contains either one or both of an acryl type resin and a vinyl chloride-vinyl acetate copolymer, as the other resin component(s), in the range of 10% by mass or more and 50% by mass or less, further in the range of 15% by mass or more and 45% by mass or less, and particularly in the range of 20% by mass or more and 40% by mass or less (when both are contained, the total mass thereof), on the basis of the total mass of the adhesive layer 3. The adhesive layer 3 of the more preferred embodiment contains an acryl type resin in the preferred range described above on the basis of the total mass of the adhesive layer 3.

Further, the adhesive layer 3 of the preferred embodiment contains the "specific copolymer" and either one or both of polymethyl methacrylate (PMMA) and polymethacrylic acid (PMAA). The copolymerization ratio of the reactive ultraviolet absorbing agent in the "specific copolymer" is in the range of 15% or more and 45% or less, particularly in the range of 20% or more and 40% or less, on a molar ratio basis, and the copolymerization ratio of the acrylic monomers is in the range of 55% or more and 85% or less, particularly in the range of 60% or more and 80% or less, on a molar ratio basis. The content of the "specific copolymer" is in the range of 50% by mass or more and 90% by mass or less, further in the range of 55% by mass or more and 85% by mass or less, and particularly in the range of 60% by mass or more and 80% by mass or less, on the basis of the total mass of the adhesive layer 3. The content of either one or both of polymethyl methacrylate (PMMA) and polymethacrylic acid (PMAA) (when both are contained, the total content thereof) is in the range of 10% by mass or more and 50% by mass or less, further in the range of 15% by mass or more and 45% by mass or less, and particularly in the range of 20% by mass or more and 40% by mass or less, on the basis of the total mass of the adhesive layer 3.

The adhesive layer 3 may contain an ultraviolet absorbing agent together with the "specific copolymer" and the other resin component(s). According to the adhesive layer 3 containing an ultraviolet absorbing agent, it is possible to further improve the light fastness. Incidentally, in the case where the adhesive layer is prepared by including a reactive ultraviolet absorbing agent and the above other resin component(s) instead of the above "specific copolymer", it is not possible to impart sufficient light fastness to the adhesive layer. As the reactive ultraviolet absorbing agent referred to herein, in addition to the reactive ultraviolet absorbing agent constituting the above "specific copolymer", non-reactive ultraviolet absorbing agents such as salicylate type, benzophenone type, benzotriazole type, triazine type, substituted acrylonitrile type, nickel-chelate type, and hindered amine type ultraviolet absorbing agents may be enumerated.

The content of the ultraviolet absorbing agent is preferably 10% by mass or less and more preferably 5% by mass or less on the basis of the total mass of the adhesive layer.

No particular limitation is imposed on the method of forming the adhesive layer 3. The adhesive layer may be formed by dissolving or dispersing the "specific copolymer", other resin component(s), and various additives to be added if necessary into a suitable solvent to prepare a coating liquid for the adhesive layer, coating this coating liquid onto the protective layer 2 or a layer which is optionally provided on the protective layer 2, and then drying the coated liquid.

There is not particular limitation on the thickness of the adhesive layer 3. The thickness is preferably in the range of 0.4 µm or more and 2 µm or less and more preferably in the range of 0.8 µm or more and 2 µm or less. With the thickness of the adhesive layer 3 set in a preferred range, it is possible to improve a foil cutting property of the adhesive layer 3 when the transfer layer 10 is transferred while the light fastness is further improved.

In the above, although the transfer layer 10 of a two-layer structure in which the protective layer 2 and the adhesive layer 3 are layered in this order from the side of the substrate 1 has been mainly described, another optional layer may be provided between the protective layer 2 and the adhesive layer 3.

Incidentally, as mentioned above, both sufficient light fastness and abrasion resistance have been imparted to the transfer layer 10 by the protective layer 2 and the adhesive layer 3 in the present invention, and thus, it is not necessarily required to provide another optional layer between the protective layer 2 and the adhesive layer 3.

(Release Layer)

A release layer (not shown) may also be provided between the substrate 1 and the transfer layer 10. When a release layer is provided, an improved peelable property of the transfer layer 10 from the substrate 1 can be expected in transferring the transfer layer 10. Incidentally, the release layer, which is not a constituent layer of the transfer layer 10, is an optional constituent in the thermal transfer sheet 100 of one embodiment.

There is no particular limitation on the components contained in the release layer, and any conventionally known resins having excellent releasability may be used. For example, waxes, silicone wax, silicone resins, silicone-modified resins, fluorine resins, fluorine-modified resins, polyvinyl alcohol, acrylic resins, acryl-styrene type copolymers, thermosetting epoxy-amino copolymers, and thermosetting alkyd-amino copolymers (thermosetting aminoalkyd resins) may be enumerated. These releasability resins may be used solely or as a mixture. The release layer may be formed by using a cross-linking agent such as isocyanate compounds, a catalyst such as tin-based catalyst and aluminum-based catalyst in combination, in addition to the resin having excellent releasability. The thickness of the release layer is generally in the range of 0.5 µm or more and 5 µm or less.

(Dye Layer)

As shown in FIGS. 1 and 2, the transfer layer 10 as described above and a dye layer 7 are provided on one surface of the substrate 1, as being frame sequentially. In the thermal transfer sheet 100 of the embodiment shown in FIG. 1, the single dye layer 7 is provided on one surface of the substrate 1. In the thermal transfer sheet of the embodiment shown in FIG. 2, a plurality of dye layers (a dye layer 7Y, a dye layer 7M, and a dye layer 7C in the embodiment shown) are provided on one surface of the substrate 1, as being frame sequentially. As a structure in which a plurality of dye layers is provided as being frame sequentially, for example, structures in which a yellow dye layer, a magenta dye layer, a cyan dye layer, and if necessary, a black dye layer and the like are provided as being frame sequentially may be enumerated.

When the dye layer 7 and the transfer layer 10 are taken as "one unit", the "one unit" may be provided repeatedly on one surface of the substrate 1.

The dye layer 7 contains a binder resin and a sublimable dye. There is no particular limitation on the binder resin contained in the dye layer 7. Conventional binder resins known in the art can be selected appropriately and used herein. As the binder resin in the dye layer 7, for example, cellulosic resins such as ethyl cellulose resins, hydroxyethyl cellulose resins, ethyl hydroxy cellulose resins, methyl cellulose resins, and cellulose acetate resins, vinyl type resins such as polyvinyl alcohol resins, polyvinyl acetate resins, polyvinyl butyral resins, polyvinyl acetal resins, and polyvinyl pyrrolidone, acryl type resins such as poly(meth)acrylate and poly(meth)acrylamide, polyurethane type resins, polyamide type resins, and polyester type resins may be enumerated.

There is not particular limitation on the content of the binder resin. The binder resin of 20% by mass or more is preferably contained on the basis of the total mass of the dye layer 7. With the content of the binder resin set at 20% by mass or more on the basis of the total mass of the dye layer, it is possible to sufficiently retain the sublimable dye in the dye layer 7 to thereby improve the storage stability. There is no particular limitation on the upper limit value of the content of the binder resin. The upper limit value may be appropriately set depending on the content of the sublimable dye and optional additives.

There is not particular limitation on the sublimable dye contained in the dye layer 7. Preferable are sublimable dyes having sufficient coloring density and undergoing no discoloration or fading due to light, heat, temperature, or the like. As the dyes, diarylmethane type dyes, triarylmethane type dyes, thiazole type dyes, merocyanine dyes, pyrazolone dyes, methine type dyes, indoaniline type dyes, azomethine type dyes such as acetophenoneazomethine, pyrazoloazomethine, imidazoleazomethine, imidazoazomethine, and pyridoneazomethine, xanthene type dyes, oxazine type dyes, cyanostyrene type dyes such as dicyanostyrene and tricyanostyrene, thiazine type dyes, azine type dyes, acridine type dyes, benzeneazo type dyes, azo type dyes such as pyridonazo, thiophenazo, isothiazoleazo, pyrroleazo, pyrazoleazo, imidazoleazo, thiadiazoleazo, triazoleazo, and disazo, spiropyran type dyes, indolinospiropyran type dyes, fluoran type dyes, rhodaminelactam type dyes, naphthoquinone type dyes, anthraquinone type dyes, and quinophthalone type dyes may be enumerated. Concretely, red dyes such as MS Red G (Mitsui Toatsu Chemicals, Inc.), Macrolex Red Violet R (Bayer AG), Ceres Red 7B (Bayer AG), and Samaron Red F3BS (Mitsubishi Chemical Corporation), yellow dyes such as Holon brilliant yellow 6GL (Clariant), PTY-52 (Mitsubishi Chemical Corporation), and Macrolex yellow 6G (Bayer AG), and blue dyes such as Kayaset® Blue 714 (Nippon Kayaku Co., Ltd.), Holon brilliant blue S-R (Clariant), MS blue 100 (Mitsui Toatsu Chemicals, Inc.), and C.I. solvent blue 63 may be enumerated.

The content of the sublimable dye is preferably in the range of 50% by mass or more and 350% by mass and more preferably in the range of 80% by mass or more and 300% by mass, on the basis of the total mass of the binder resin. With the content of the sublimable dye set in the above preferred range, it is possible to further improve the printing density and storage stability.

Incidentally, the thermal transfer sheet 100 of one embodiment, which comprises a dye layer and a transfer layer, is a thermal transfer sheet in a form in which a sublimable dye that has been kicked to the back side is likely to remigrate to the surface of the transfer layer. However, as described above, the thermal transfer sheet 100 of one embodiment is capable of sufficiently inhibit the sublimable dye that has been kicked to the back side from backing to the transfer layer 10 because a sufficient back prevention property has been imparted to the adhesive layer 3 constituting the transfer layer 10.

(Dye Primer Layer)

A dye primer layer (not shown) may also be provided between the substrate 1 and the dye layer 7. There is no particular limitation on the components contained in the dye primer layer. For example, polyester type resins, polyvinyl pyrrolidone resins, polyvinyl alcohol resins, hydroxyethyl cellulose, polyacrylic acid ester type resins, polyvinyl acetate type resins, polyurethane type resins, acryl-styrene type copolymers, polyacrylamide type resins, polyamide type resins, polyether type resins, polystyrene type resins, polyethylene type resins, polypropylene type resins, polyvinyl chloride resins, and polyvinyl acetal type resins such as polyvinyl acetoacetal and polyvinyl butyral may be enumerated.

The dye primer layer may also contain colloidal inorganic pigment ultrafine particles. As the colloidal inorganic pigment ultrafine particles, for example, silica (colloidal silica), alumina or hydrated alumina (alumina sol, colloidal alumina, cationic aluminum oxide or hydrates thereof, and pseudoboehmite, and the like), aluminum silicate, magnesium silicate, magnesium carbonate, magnesium oxide, and titanium oxide may be enumerated. Particularly, colloidal silica and alumina sol are preferably used. These colloidal inorganic pigment ultrafine particles having a size, as a primary average particle size, of 100 nm or less and more preferably 50 nm or less are preferably used.

(Back Face Layer)

In addition, a back face layer (not shown) may be provided on the other surface of the substrate 1, for the purpose of improving the driving stability of the thermal head on transferring the transfer layer 10. Incidentally, the back face layer is an optional constituent in the thermal transfer sheet of one embodiment.

The back face layer may be formed by selecting and using resin(s) from the conventionally known thermoplastic resins and the like, appropriately. As the thermoplastic resin like this, for example, polyester type resins, polyacrylic ester type resins, polyvinyl acetate type resins, acryl-styrene type copolymers, polyurethane type resins, polyolefin type resins such as polyethylene type resins and polypropylene type resins, polystyrene type resins, polyvinyl chloride type resins, polyether type resins, polyamide type resins, polyimide type resins, polyamide imide type resins, polycarbonate type resins, polyacrylamide resins, polyvinyl chloride resins, polyvinyl butyral resins, polyvinyl acetal resins such as polyvinyl acetoacetal resins, and silicone modified forms thereof may be enumerated. Among them, polyamide imide type resins and silicone modified form thereof may preferably be used, in respect of the heat resistance and the like. These resins may be those prepared by curing with a curing agent. As the curing agent, for example, isocyanate type curing agents may be enumerated.

Further, it is preferable that the back face layer contain various additives for improving a slipping property, for instance, release agents such as waxes, higher fatty acid amides, phosphoric ester compounds, metal soaps, silicone oils, and surfactants, organic particles such as fluorine-containing resin, and inorganic particles such as silica, clay, talc, and calcium carbonate, in addition to the thermoplastic resin as mentioned above. Particularly, it is preferable to contain at least one of the phosphoric esters and metal soaps.

The back face layer may be formed by dispersing or dissolving, for example, the above thermoplastic resin and various additives to be added if necessary into a suitable solvent to prepare a coating liquid for the back face layer, coating this coating liquid onto the other surface of the substrate 1, and then drying the coated liquid. The thickness of the back face layer is preferably in the range of 0.1 μm or more and 5 μm or less and more preferably in the range of 0.3 μm or more and 2 μm or less, from the viewpoint of improvement in the heat resistance and the like.

(Method for Producing a Print)

Figure 3A:
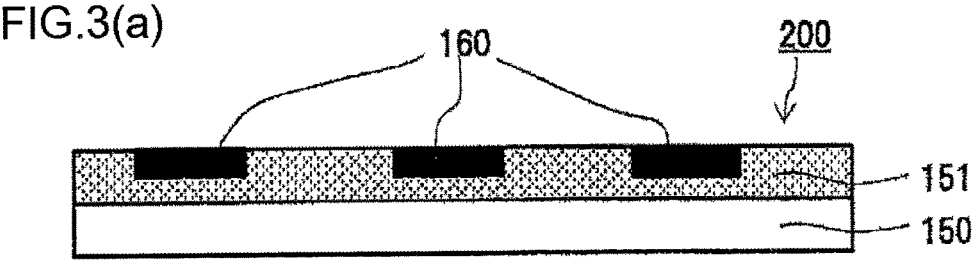
FIG. 3 is a process chart showing an example of a method for producing a print by use of the thermal transfer sheet of one embodiment.
Figure 3B:
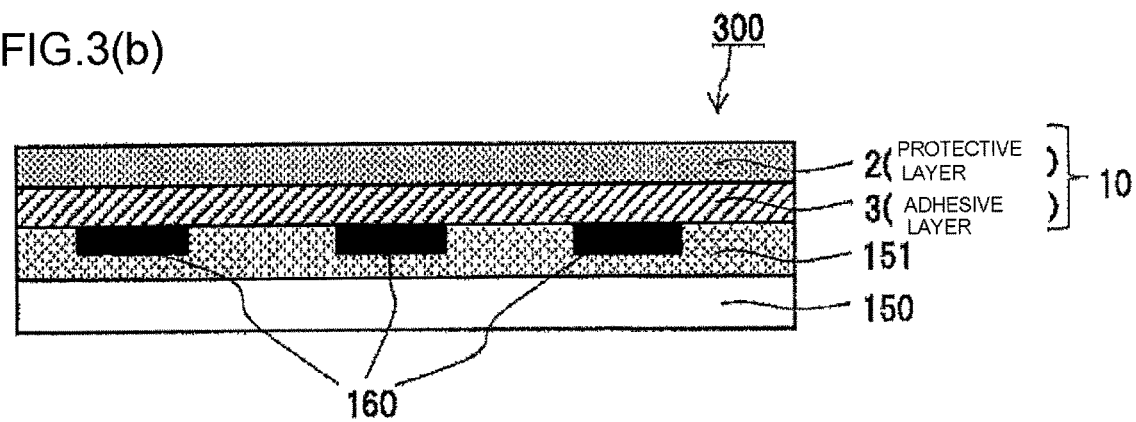

Next, a method for producing a print by use of the thermal transfer sheet of one embodiment will be described with reference to FIG. 3.

The method for producing a print as one example comprises a thermal transferred image formation step and a transfer layer transfer step. The thermal transferred image formation step is a step including combining a medium having a receiving layer having a dye-receiving ability, for example, a thermal transfer image-receiving sheet 200 in which a receiving layer 151 is provided on one surface of a substrate 150 with the thermal transfer sheet 100 of one embodiment and allowing the sublimable dye contained in the dye layer 7 to diffusively migrate onto the receiving layer 151 by use of the sublimation type thermal transfer method as shown in FIG. 3A to form a thermal transferred image 160. The transfer layer transfer step is a step including combining a thermal transfer image-receiving sheet 200 on which a thermal transferred image 160 has been formed with the thermal transfer sheet 100 of one embodiment and transferring the transfer layer 10 onto the thermal transferred image 160 by use of a thermal fusion type thermal transfer method. A print 300 prepared by transferring the transfer layer 10 onto the thermal transferred image 160 formed on the receiving layer 151 of the thermal transfer image-receiving sheet 200 is obtained through the transfer layer transfer step. Incidentally, the sublimation type thermal transfer method is an image formation method including bringing a heating device such as a thermal head into contact with the back side of the thermal transfer sheet and applying energy depending on the image information by the heating device to the back side of the thermal transfer sheet such that the sublimable dye contained in the dye layer 7 of the thermal transfer sheet 100 of one embodiment diffusively migrates onto the receiving layer 151 to thereby form a thermal transferred image 160. The thermal fusion type thermal transfer method is a method including applying energy by a heating device such as a thermal head to the back side of the thermal transfer sheet to melt and soften the transfer layer 10 corresponding to the region to which heat is applied and transferring the molten and softened transfer layer 10 onto the receiving layer 151 onto which the thermal transferred image is formed. Incidentally, transfer of the transfer layer 10 by means of the thermal fusion type thermal transfer method may be carried out not only by a heating device such as a thermal head but also by using, for example, a hot stamp method or heat roll method.

Formation of the thermal transferred image 160 is not limited to the above thermal transfer image-receiving sheet, and any media may be used as long as it can receive a sublimable dye.

EXAMPLES

Next, the present invention will be described more concretely with reference to Examples and Comparative Examples. Hereinafter, unless otherwise specified, the expression of part(s) or % means that by mass. The ratio of a copolymer means a copolymerization ratio (on a molar ratio basis). Hereinafter, methyl methacrylate, polymethyl methacrylate, polymethacrylic acid, and styrene are abbreviated as MMA, PMMA, PMAA, and St, respectively. A glass transition temperature and a weight average molecular weight are abbreviated as Tg and Mw, respectively.

As a reactive ultraviolet absorbing agent (1) constituting a reactive ultraviolet absorbing agent-acrylic monomer copolymer, a reactive ultraviolet absorbing agent (RUVA-93, Otsuka Chemical Co., Ltd.) was used. As a reactive ultraviolet absorbing agent (2), a reactive ultraviolet absorbing agent represented by the following structural formula (1) was used. As a reactive ultraviolet absorbing agent (3), a reactive ultraviolet absorbing agent represented by the following structural formula (2) was used. Incidentally, the reactive ultraviolet absorbing agent (1) is a benzotriazole type reactive ultraviolet absorbing agent, the reactive ultraviolet absorbing agent (2) is a benzophenone type reactive ultraviolet absorbing agent, and the reactive ultraviolet absorbing agent (3) is a triazine type reactive ultraviolet absorbing agent.

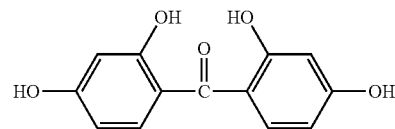

Formula 1

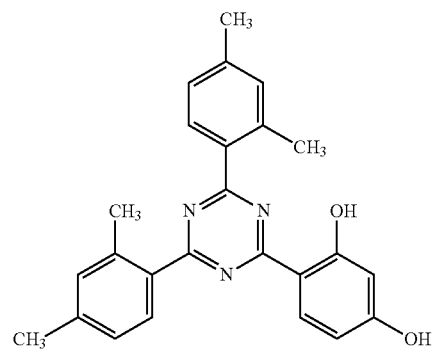

Formula 2

Substrate 1: polyethylene terephthalate film (4.5 μm, Toray Industries, Inc.)
(SRa≤20 nm, SPc≤100, SRm≤1100 nm)

Substrate 2: polyethylene terephthalate film (4.5 μm, Toray Industries, Inc.)
(20 nm≤SRa≤40 nm, 100≤SPc≤200, 1100 nm≤SRm≤2000 nm)

<Coating Liquid for Protective Layer 1>

| | |
|---|---|
| acrylic resin (DIANAL(R) BR-87, Mitsubishi Chemical Corporation) | 65 parts |
| acryl-styrene type copolymers (DIANAL(R) BR-52, Mitsubishi Chemical Corporation) | 30 parts |
| talc (MICRO ACE(R) P-3, Nippon Talc Co., Ltd.) | 3 parts |
| dispersant (DISPER BYK 180, BYK) | 2 parts |
| methyl ethyl ketone | 240 parts |
| normal propyl acetate | 60 parts |

<Coating Liquid for Protective Layer 2>

| | |
|---|---|
| acrylic resin (DIANAL(R) BR-87, Mitsubishi Chemical Corporation) | 68 parts |
| acryl-styrene type copolymers (DIANAL(R) BR-52, Mitsubishi Chemical Corporation) | 32 parts |
| methyl ethyl ketone | 240 parts |
| normal propyl acetate | 60 parts |

<Coating Liquid for Protective Layer 3>

| | |
|---|---|
| polycarbonate resin (PCZ-200, Mitsubishi Gas Chemical Company, Inc.) | 97 parts |
| talc (MICRO ACE(R) P-3, Nippon Talc Co., Ltd.) | 3 parts |
| dispersant (DISPER BYK 180, BYK) | 2 parts |
| methyl ethyl ketone | 240 parts |
| normal propyl acetate | 60 parts |

<Coating Liquid for Protective Layer 4>

| | |
|---|---|
| phenoxy resin (PKHB, InChem Corporation) | 97 parts |
| talc (MICRO ACE(R) 9-3, Nippon Talc Co., Ltd.) | 3 parts |
| dispersant (DISPER BYK 180, BYK) | 2 parts |
| methyl ethyl ketone | 240 parts |
| normal propyl acetate | 60 parts |

<Coating Liquid for Adhesive Layer 1>

| | |
|---|---|
| reactive ultraviolet absorbing agent (1)-MMA copolymer (ratio 30:70) (Tg: 90° C., Mw: 20000-40000) | 63 parts |
| PMMA (DIANAL(R) BR-83, Mitsubishi Chemical Corporation) | 27 parts |
| ultraviolet absorbing agent (Tinuvin 928, BASF Japan) | 10 parts |
| methyl ethyl ketone | 240 parts |
| normal propyl acetate | 60 parts |

<Coating Liquid for Adhesive Layer 2>

| | |
|---|---|
| reactive ultraviolet absorbing agent (1)-MMA copolymer (ratio 30:70) (Tg: 90° C., Mw: 20000-40000) | 70 parts |
| PMMA (DIANAL(R) BR-83, Mitsubishi Chemical Corporation) | 30 parts |
| methyl ethyl ketone | 240 parts |
| normal propyl acetate | 60 parts |

<Coating Liquid for Adhesive Layer 3>

| | |
|---|---|
| reactive ultraviolet absorbing agent (1)-MMA copolymer (ratio 30:70) (Tg: 90° C., Mw: 20000-40000) | 63 parts |
| PMAA (DIANAL(R) BR-87, Mitsubishi Chemical Corporation) | 27 parts |
| ultraviolet absorbing agent (Tinuvin 928, BASF Japan) | 10 parts |
| methyl ethyl ketone | 240 parts |
| normal propyl acetate | 60 parts |

<Coating Liquid for Adhesive Layer 4>

| | |
|---|---|
| reactive ultraviolet absorbing agent (1)-MMA copolymer (ratio 30:70) (Tg: 90° C., Mw: 20000-40000) | 63 parts |
| PMMA (DIANAL(R) BR-83, Mitsubishi Chemical Corporation) | 14 parts |
| vinyl chloride-vinyl acetate copolymer (SOLBIN(R) CNL, Nissin Chemical Industry Co., Ltd.) | 13 parts |
| ultraviolet absorbing agent (Tinuvin 928, BASF Japan) | 10 parts |
| methyl ethyl ketone | 240 parts |
| normal propyl acetate | 60 parts |

<Coating Liquid for Adhesive Layer 5>

| | |
|---|---|
| reactive ultraviolet absorbing agent (1)-MMA copolymer (ratio 30:70) (Tg: 90° C., Mw: 20000-40000) | 63 parts |
| vinyl chloride-vinyl acetate copolymer (SOLBIN(R) CNL, Nissin Chemical Industry Co., Ltd.) | 27 parts |
| ultraviolet absorbing agent (Tinuvin 928, BASF Japan) | 10 parts |
| methyl ethyl ketone | 240 parts |
| normal propyl acetate | 60 parts |

<Coating Liquid for Adhesive Layer 6>

| | |
|---|---|
| reactive ultraviolet absorbing agent (1)-MMA copolymer (ratio 30:70) (Tg: 90° C., Mw: 20000-40000) | 63 parts |
| polyester resin (Vylon(R) 226, TOYOBO Co., Ltd.) | 27 parts |
| ultraviolet absorbing agent (Tinuvin 928, BASF Japan) | 10 parts |
| methyl ethyl ketone | 240 parts |
| Normal propyl acetate | 60 parts |

<Coating Liquid for Adhesive Layer 7>

| | |
|---|---|
| reactive ultraviolet absorbing agent (1)-MMA copolymer (ratio 10:90) (Tg: 100° C., Mw: 20000-40000) | 63 parts |
| PMMA (DIANAL (R) BR-83, Mitsubishi Chemical Corporation) | 27 parts |
| ultraviolet absorbing agent (Tinuvin 928, BASF Japan) | 10 parts |
| methyl ethyl ketone | 240 parts |
| Normal propyl acetate | 60 parts |

<Coating Liquid for Adhesive Layer 8>

| | |
|---|---|
| reactive ultraviolet absorbing agent (1)-MMA copolymer (ratio 50:50) (Tg: 80° C., Mw: 20000-40000) | 63 parts |
| PMMA (DIANAL (R) BR-83, Mitsubishi Chemical Corporation) | 27 parts |
| ultraviolet absorbing agent (Tinuvin 928, BASF Japan) | 10 parts |
| methyl ethyl ketone | 240 parts |
| Normal propyl acetate | 60 parts |

<Coating Liquid for Adhesive Layer 9>

| | |
|---|---|
| reactive ultraviolet absorbing agent (1)-MMA copolymer (ratio 30:70) (Tg: 90° C., Mw: 20000-40000) | 81 parts |
| PMMA (DIANAL (R) BR-83, Mitsubishi Chemical Corporation) | 9 parts |
| ultraviolet absorbing agent (Tinuvin 928, BASF Japan) | 10 parts |
| methyl ethyl ketone | 240 parts |
| normal propyl acetate | 60 parts |

<Coating Liquid for Adhesive Layer 10>

| | |
|---|---|
| reactive ultraviolet absorbing agent (1)-MMA copolymer (ratio 30:70) (Tg: 90° C., Mw: 20000-40000) | 45 parts |
| PMMA (DIANAL (R) BR-83, Mitsubishi Chemical Corporation) | 45 parts |
| ultraviolet absorbing agent (Tinuvin 928, BASF Japan) | 10 parts |
| methyl ethyl ketone | 240 parts |
| normal propyl acetate | 60 parts |

<Coating Liquid for Adhesive Layer 11>

| | |
|---|---|
| reactive ultraviolet absorbing agent (1)-MMA-St copolymer (ratio 30:50:20) (Tg: 90° C., Mw: 20000-40000) | 63 parts |
| PMMA (DIANAL (R) BR-83, Mitsubishi Chemical Corporation) | 27 parts |
| ultraviolet absorbing agent (Tinuvin 928, BASF Japan) | 10 parts |
| methyl ethyl ketone | 240 parts |
| normal propyl acetate | 60 parts |

<Coating Liquid for Adhesive Layer 12>

| | |
|---|---|
| reactive ultraviolet absorbing agent (2)-MMA copolymer (ratio 30:70) (Tg: 90° C., Mw: 20000-40000) | 63 parts |
| PMMA (DIANAL (R) BR-83, Mitsubishi Chemical Corporation) | 27 parts |
| ultraviolet absorbing agent (Tinuvin 928, BASF Japan) | 10 parts |
| methyl ethyl ketone | 240 parts |
| normal propyl acetate | 60 parts |

<Coating Liquid for Adhesive Layer 13>

| | |
|---|---|
| reactive ultraviolet absorbing agent (3)-MMA copolymer (ratio 30:70) (Tg: 90° C., Mw: 20000-40000) | 63 parts |
| PMMA (DIANAL (R) BR-83, Mitsubishi Chemical Corporation) | 27 parts |
| ultraviolet absorbing agent (Tinuvin 928, BASF Japan) | 10 parts |
| methyl ethyl ketone | 240 parts |
| normal propyl acetate | 60 parts |

<Coating Liquid for Adhesive Layer A>

| | |
|---|---|
| reactive ultraviolet absorbing agent (1)-MMA copolymer (ratio 60:40) (Tg: 70° C., Mw: 20000-40000) | 63 parts |
| PMMA (DIANAL (R) BR-83, Mitsubishi Chemical Corporation) | 27 parts |
| ultraviolet absorbing agent (Tinuvin 928, BASF Japan) | 10 parts |
| methyl ethyl ketone | 240 parts |
| normal propyl acetate | 60 parts |

<Coating Liquid for Adhesive Layer B>

| | |
|---|---|
| reactive ultraviolet absorbing agent (1)-MMA copolymer (ratio 5:95) (Tg: 105° C., Mw: 20000-40000) | 63 parts |
| PMMA (DIANAL (R) BR-83, Mitsubishi Chemical Corporation) | 27 parts |
| ultraviolet absorbing agent (Tinuvin 928, BASF Japan) | 10 parts |
| methyl ethyl ketone | 240 parts |
| normal propyl acetate | 60 parts |

<Coating Liquid for Adhesive Layer C>

| | |
|---|---|
| reactive ultraviolet absorbing agent (1)-MMA copolymer (ratio 30:70) (Tg: 90° C., Mw: 20000-40000) | 90 parts |
| ultraviolet absorbing agent (Tinuvin 928, BASF Japan) | 10 parts |
| methyl ethyl ketone | 240 parts |
| normal propyl acetate | 60 parts |

<Coating Liquid for Adhesive Layer D>

| | |
|---|---|
| reactive ultraviolet absorbing agent (1)-MMA copolymer (ratio 30:70) (Tg: 90° C., Mw: 20000-40000) | 36 parts |
| PMMA (DIANAL (R) BR-83, Mitsubishi Chemical Corporation) | 54 parts |
| ultraviolet absorbing agent (Tinuvin 928, BASF Japan) | 10 parts |
| methyl ethyl ketone | 240 parts |
| normal propyl acetate | 60 parts |

<Coating Liquid for Adhesive Layer E>

| | |
|---|---|
| reactive ultraviolet absorbing agent (1)-St copolymer (ratio 30:70) (Tg: 90° C., Mw: 20000-40000) | 63 parts |
| PMMA (DIANAL (R) BR-83, Mitsubishi Chemical Corporation) | 27 parts |
| ultraviolet absorbing agent (Tinuvin 928, BASF Japan) | 10 parts |
| methyl ethyl ketone | 240 parts |
| normal propyl acetate | 60 parts |

<Coating Liquid for Back Face Layer>

| | |
|---|---|
| polyvinyl acetal (hydroxyl value 12% by mass) (S-LEC (R) KS-1, Sekisui Chemical Co., Ltd.) | 47.6 parts |
| polyisocyanate (NCO = 17.3% by mass) (BURNOCK (R) D750, DIC Corporation) | 15 parts |
| silicone resin fine particles (average particle size: 4 μm polygonal) (Tospearl 240, Momentive Performance Materials Japan LLC) | 1 part |
| zinc stearyl phosphate (LBT-1830 purified, Sakai Chemical Industry Co., Ltd.) | 12 parts |
| zinc stearate (SZ-PF, Sakai Chemical Industry Co., Ltd.) | 12 parts |
| polyethylene wax (Polywax 3000, Toyo Petrolite Co., Ltd.) | 3.5 parts |
| ethoxylated alcohol-modified wax (Unithox 750, TOYO ADL CORPORATION) | 8.5 parts |
| methyl ethyl ketone | 200 parts |
| toluene | 100 parts |

Incidentally, the molar equivalent ratio of the isocyanate group possessed by polyisocyanate on the basis of the hydroxyl group possessed by the polyvinyl acetal resin (—NCO/—OH) is 0.5.

Example 1

The coating liquid for protective layer 1 having the above composition was coated onto one surface of the substrate so as to obtain a thickness of 1 μm in the dried state, and then, the coated liquid was dried to form a protective layer. Then, the coating liquid for adhesive layer 1 having the above composition was coated onto the protective layer so as to obtain a thickness of 1 μm in the dried state, and then, the coated liquid was dried to form an adhesive layer. Additionally, the coating liquid for back face layer having the above composition was coated onto the other surface of the substrate so as to obtain a thickness of 0.5 μm in the dried state, and then, the coated liquid was dried to form a back face layer. Thus, obtained was the thermal transfer sheet of Example 1, in which a transfer layer in which the protective layer and the adhesive layer were layered in this order was provided on one surface of the substrate and the back face layer was provided on the other surface of the substrate.

Incidentally, for convenience of the storage stability evaluation described below, the thermal transfer sheet of Example 1 has a structure in which no coloring material layer is provided on the same surface of the substrate on which the transfer layer is located. The same is applicable to the thermal transfer sheet of each of Examples and Comparative Examples.

Examples 2 to 17 and Comparative Examples 1 to 6

The thermal transfer sheet of each of Examples 2 to 17 and Comparative Examples 1 to 6 was obtained by using the same method as in Example 1 except that the substrate 1, the coating liquid for protective layer 1, and the coating liquid for adhesive layer 1 in Example 1 were replaced respectively by the substrate, coating liquid for protective layer, and coating liquid for adhesive layer shown in the following Table 1. Incidentally, the thermal transfer sheet of Comparative Example 6 has a structure in which the adhesive layer is provided on one surface of the substrate and the back face layer is provided on the other surface of the substrate. Hereinafter, the layered product of the protective layer and the adhesive layer is referred to as the transfer layer (in Comparative Example 6, the adhesive layer is referred to as the transfer layer).

TABLE 1

| | Substrate | Coating liquid for protective layer | Coating liquid for adhesive layer |
|---|---|---|---|
| Example 1 | Substrate 1 | Coating liquid for protective layer 1 | Coating liquid for adhesive layer 1 |
| Example 2 | Substrate 2 | Coating liquid for protective layer 1 | Coating liquid for adhesive layer 1 |
| Example 3 | Substrate 2 | Coating liquid for protective layer 1 | Coating liquid for adhesive layer 2 |
| Example 4 | Substrate 2 | Coating liquid for protective layer 1 | Coating liquid for adhesive layer 3 |
| Example 5 | Substrate 2 | Coating liquid for protective layer 1 | Coating liquid for adhesive layer 4 |
| Example 6 | Substrate 2 | Coating liquid for protective layer 1 | Coating liquid for adhesive layer 5 |
| Example 7 | Substrate 2 | Coating liquid for protective layer 1 | Coating liquid for adhesive layer 6 |
| Example 8 | Substrate 2 | Coating liquid for protective layer 1 | Coating liquid for adhesive layer 7 |
| Example 9 | Substrate 2 | Coating liquid for protective layer 1 | Coating liquid for adhesive layer 8 |
| Example 10 | Substrate 2 | Coating liquid for protective layer 1 | Coating liquid for adhesive layer 9 |
| Example 11 | Substrate 2 | Coating liquid for protective layer 1 | Coating liquid for adhesive layer 10 |
| Example 12 | Substrate 2 | Coating liquid for protective layer 3 | Coating liquid for adhesive layer 1 |
| Example 13 | Substrate 2 | Coating liquid for protective layer 4 | Coating liquid for adhesive layer 1 |
| Example 14 | Substrate 2 | Coating liquid for protective layer 2 | Coating liquid for adhesive layer 1 |
| Example 15 | Substrate 2 | Coating liquid for protective layer 1 | Coating liquid for adhesive layer 11 |
| Example 16 | Substrate 2 | Coating liquid for protective layer 1 | Coating liquid for adhesive layer 12 |
| Example 17 | Substrate 2 | Coating liquid for protective layer 1 | Coating liquid for adhesive layer 13 |
| Comparative Example 1 | Substrate 2 | Coating liquid for protective layer 1 | Coating liquid for adhesive layer A |
| Comparative Example 2 | Substrate 2 | Coating liquid for protective layer 1 | Coating liquid for adhesive layer B |
| Comparative Example 3 | Substrate 2 | Coating liquid for protective layer 1 | Coating liquid for adhesive layer C |
| Comparative Example 4 | Substrate 2 | Coating liquid for protective layer 1 | Coating liquid for adhesive layer D |

TABLE 1-continued

| | Substrate | Coating liquid for protective layer | Coating liquid for adhesive layer |
|---|---|---|---|
| Comparative Example 5 | Substrate 2 | Coating liquid for protective layer 1 | Coating liquid for adhesive layer E |
| Comparative Example 6 | Substrate 2 | Not applicable | Coating liquid for adhesive layer 1 |

(Abrasion Resistance Evaluation)

A sublimable type thermal transfer printer (DS40, Dai Nippon Printing Co., Ltd.) and a genuine ribbon of the printer were used to print a solid black image (0/255 gray scale) on a genuine image receiving sheet as a transfer receiving article under default conditions. Then, the thermal transfer sheet of each of Examples and Comparative Examples was used to transfer the transfer layer onto the above solid black image by use of the same printer to thereby obtain a print of each of Examples and Comparative Examples. The region of this print on which the solid black image had been formed was cut into a piece having a width of 2 cm. After a 300-g weight was placed on the print with a test cloth (Kanakin No. 3) interposed therebetween and the print with the weight was reciprocated 10 times, the surface condition of the print was visually observed, and the abrasion resistance was evaluated based on the following evaluation criteria. The evaluation results are shown in Table 2.

[Evaluation Criteria]

A: Substantially no change in the surface conditions of the transfer layer is observed.

B: The transfer layer remains, but the protective layer is flawed.

NG: The transfer layer is exfoliated, or the adhesive layer is flawed.

(Light Fastness Evaluation)

A sublimable type thermal transfer printer (DS40, Dai Nippon Printing Co., Ltd.) and a genuine ribbon of the printer were used to print a step image of Ye (yellow), Mg (magenta), Cy (cyan), and Bk (black) on a genuine image receiving sheet as a transfer receiving article under default conditions. Then, the thermal transfer sheet of each of Examples and Comparative Examples was used to transfer the transfer layer onto the above step image by use of the same printer to thereby obtain a print of each of Examples and Comparative Examples. The light fastness test in compliance with JEITACP-3901B was conducted on the print of each of Examples and Comparative Examples, and the light fastness was evaluated based on the lifetime calculated. The evaluation results are shown in Table 2.

[Evaluation Criteria]

A: The lifetime is 5 years or more.
B: The lifetime is 3 years or more and less than 5 years.
C: The lifetime is 1 year or more and less than 3 years.
NG: The lifetime is less than 1 year.

(Storage Stability Evaluation (Back Evaluation))

The coating liquid for back face layer having the above mentioned composition was coated onto one surface of a polyethylene terephthalate film (4.5 μm, Toray Industries, Inc.) as a substrate so as to obtain a thickness of 0.5 μm in the dried state, and then, the coated liquid was dried to form a back face layer. Thus, a substrate having a back face layer was obtained, wherein the back face layer was formed on the substrate. Subsequently, the magenta portion of a genuine ribbon for a sublimable type thermal transfer printer (DS40, Dai Nippon Printing Co., Ltd.) was opposed to the back face layer of the substrate having a back face layer obtained above. Under a load of 1.96 MPa (20 kg/cm$^2$) applied thereto, the magenta portion and the layer was stored under an environment of 40° C. and a humidity of 90% for 96 hours to allow the magenta dye to migrate (be kicked) to the back face layer of the substrate having a back face layer.

The substrate having a back face layer onto which the dye was allowed to be kicked by the above method and the thermal transfer sheet of each of Examples and Comparative Examples were superposed on each other such that the back face layer of the substrate having a back face layer was opposed to the transfer layer of the thermal transfer sheet of each of Examples and Comparative Examples. While a constant load compression tester (Toyo Seiki Seisaku-sho, Ltd.) was used to apply a load of 1.96 MPa (20 kg/cm$^2$) onto the superposed layers, the layers were stored under an environment of 60° C. and a humidity of 20% RH for 24 hours to force the dye to remigrate (back) from the side of the back face layer of the substrate having a back face layer to the transfer layer of the thermal transfer sheet of each of Examples and Comparative Examples. Thereafter, the thermal transfer sheet of each of Examples and Comparative Examples to which the dye had remigrated (backed) and a genuine image receiving sheet for a sublimable type thermal transfer printer (DS40, Dai Nippon Printing Co., Ltd.) were superposed on each other such that the transfer layer of the thermal transfer sheet of each of Examples and Comparative Examples was opposed to the image receiving face of the genuine image receiving sheet. A laminate tester (Lamipacker LPD2305PRO, FUJIPLA Inc.) was used to transfer the transfer layer onto the side of the genuine image receiving sheet under conditions of a process temperature of 110° C. and a process speed of 1 m/minute to obtain a transferred material of each of Examples and Comparative Examples. The hue of the transferred material of each of Examples and Comparative Examples was measured by use of Spectrolino (X-Rite Inc.) (D65 light source, view angle 2°), and the value was evaluated based on the following criteria. The evaluation results are shown in Table 2.

(Color Difference Expression)

$$\Delta E^* = ((\text{difference between } L^* \text{ values before and after opposition})^2 + (\text{difference between } a^* \text{ values before and after opposition})^2 + (\text{difference between } b^* \text{ values before and after opposition})^2)^{1/2}$$

Incidentally, the L*a*b* means the L*a*b* specified in CIE1976, L*a*b* color system (JIS-Z-8729 (1980)).

[Evaluation Criteria]

A: The color difference ΔE* between the transferred material onto which unstored transfer layer has been transferred and the transferred material onto which the transfer layer subjected to backing has been transferred is less than 0.8.

B: The color difference ΔE* between the transferred material onto which unstored transfer layer has been transferred and the transferred material onto which the transfer layer subjected to backing has been transferred is 0.8 or more and less than 1.6.

C: The color difference ΔE* between the transferred material onto which unstored transfer layer has been transferred and the transferred material onto which the transfer layer subjected to backing has been transferred is 1.6 or more and less than 3.2.

NG: The color difference ΔE* between the transferred material onto which unstored transfer layer has been transferred and the transferred material onto which the transfer layer subjected to backing has been transferred is 3.2 or more.

(Glossiness Evaluation)

A sublimable type thermal transfer printer (DS40, Dai Nippon Printing Co., Ltd.) and a genuine ribbon of the printer were used to print a solid black image (0/255 gray scale) on the right half of a genuine image receiving sheet as a transfer receiving article under default conditions. The right-half region on which the solid black image had been printed was defined as a solid black region. Meanwhile, no image was formed on the left half of the genuine image receiving sheet. This region, on which no image was formed, was defined as a solid white region. Then, the thermal transfer sheet of each of Examples and Comparative Examples was used to transfer the transfer layer (adhesive layer+protective layer (adhesive layer in Comparative Example 6)) onto the solid black region and the solid white region described above by use of the same printer to thereby obtain a print of each of Examples and Comparative Examples. The glossiness of each of the portion of the solid black region onto which the transfer layer had been transferred and the portion of the solid white region onto which the transfer layer had been transferred in this print was measured with a glossiness meter (Gloss meter VG7000 (Nippon Denshoku Industries Co. Ltd.)) (measurement angle) 20°, and the glossiness was evaluated based on the following evaluation criteria. The evaluation results are shown in Table 2.

[Evaluation Criteria]

A: The glossiness of the solid black region is 60% or more and the glossiness of the solid white region was 55% or more.

B: The glossiness of the solid black region is 50% or more and less than 60% or the glossiness of the solid white region is 45% or more and less than 55% (except for the case in which the following "C" or "D" is satisfied).

C: The glossiness of the solid black region is 40% or more and less than 50% or the glossiness of the solid white region is 35% or more and less than 45% (except for the case in which the following "D" is satisfied).

NG: The glossiness of the solid black region is less than 40% or the glossiness of the solid white region is less than 35%.

TABLE 2

|  | Abrasion resistance | Light fastness | Back | Glossiness |
|---|---|---|---|---|
| Example 1 | A | B | B | A |
| Example 2 | A | B | B | B |
| Example 3 | A | C | B | B |
| Example 4 | A | B | B | B |
| Example 5 | A | B | B | B |
| Example 6 | A | B | C | B |
| Example 7 | A | B | C | C |
| Example 8 | A | C | A | B |
| Example 9 | B | A | C | B |
| Example 10 | B | A | C | B |
| Example 11 | A | C | A | B |
| Example 12 | A | B | B | B |
| Example 13 | A | B | B | B |
| Example 14 | B | B | B | B |
| Example 15 | B | B | C | B |
| Example 16 | A | C | B | B |
| Example 17 | A | C | B | B |
| Comparative Example 1 | NG | A | NG | NG |
| Comparative Example 2 | A | NG | A | B |
| Comparative Example 3 | NG | A | NG | B |
| Comparative Example 4 | A | NG | B | B |
| Comparative Example 5 | NG | B | NG | B |
| Comparative Example 6 | NG | B | B | NG |

REFERENCE SIGNS LIST

1 Substrate
2 Protective layer
3 Adhesive layer
4 Dye layer
10 Transfer layer
100 Thermal transfer sheet
150 Substrate for thermal transfer image-receiving sheet
151 Receiving layer
160 Thermal transferred image
200 Thermal transfer image-receiving sheet
300 Print

The invention claimed is:

1. A thermal transfer sheet comprising a transfer layer and a dye layer provided on one surface of a substrate, as being frame sequentially, wherein:
   the transfer layer has a layered structure comprising a protective layer and an adhesive layer layered in this order from the side of the substrate;
   the adhesive layer contains two or more resin components;
   one of the two or more resin components is a copolymer of a reactive ultraviolet absorbing agent and an acrylic monomer;
   in the copolymer of the reactive ultraviolet absorbing agent and the acrylic monomer, the copolymerization ratio of the reactive ultraviolet absorbing agent is in the range of 10% or more and 50% or less on a molar ratio basis and the copolymerization ratio of the acrylic monomers is in the range of 50% or more and 90% or less on a molar ratio basis; and
   the content of the copolymer of the reactive ultraviolet absorbing agent and the acrylic monomer is in the range of 50% by mass or more and 90% by mass or less on the basis of the total mass of the adhesive layer.

2. The thermal transfer sheet according to claim 1, wherein the other one component of the two or more resin components is either one or both of an acryl type resin and a vinyl chloride-vinyl acetate copolymer.

3. The thermal transfer sheet according to claim 1, wherein the protective layer contains a binder resin and talc.

4. The thermal transfer sheet according to claim 3, wherein the binder resin contained in the protective layer is any of an acryl type resin, a polycarbonate type resin, and a phenoxy type resin.

5. The thermal transfer sheet according to claim 1, wherein the reactive ultraviolet absorbing agent, which constitutes the copolymer of the reactive ultraviolet absorbing agent and an acrylic monomer, is a benzotriazole type reactive ultraviolet absorbing agent.

* * * * *